United States Patent
Lin et al.

(10) Patent No.: US 8,694,540 B1
(45) Date of Patent: Apr. 8, 2014

(54) PREDICTIVE ANALYTICAL MODEL SELECTION

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/246,410

(22) Filed: Sep. 27, 2011

Related U.S. Application Data

(60) Provisional application No. 61/530,252, filed on Sep. 1, 2011.

(51) Int. Cl.
*G06F 17/30* (2006.01)

(52) U.S. Cl.
USPC ........... 707/777; 707/771; 707/772; 707/773; 707/774; 707/778

(58) Field of Classification Search
CPC ................................. G06F 17/30; G06F 17/00
See application file for complete search history.

(56) References Cited

U.S. PATENT DOCUMENTS

| | | | |
|---|---|---|---|
| 5,271,088 A | 12/1993 | Bahler | |
| 6,243,696 B1 | 6/2001 | Keeler et al. | |
| 6,778,959 B1 | 8/2004 | Wu et al. | |
| 6,879,971 B1 | 4/2005 | Keeler et al. | |
| 7,010,696 B1 | 3/2006 | Cambridge et al. | |
| 7,054,847 B2 | 5/2006 | Hartman et al. | |
| 7,194,395 B2 | 3/2007 | Genovese | |
| 7,349,919 B2 | 3/2008 | Russell et al. | |
| 7,565,304 B2 | 7/2009 | Casati et al. | |
| 7,590,589 B2 | 9/2009 | Hoffberg | |
| 7,606,924 B2 | 10/2009 | Raz et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |
| 7,813,870 B2 | 10/2010 | Downs et al. | |
| 7,813,944 B1 | 10/2010 | Luk et al. | |
| 7,818,276 B2 * | 10/2010 | Veillette et al. ................. | 706/47 |

(Continued)

OTHER PUBLICATIONS

Weiss, Integrating Real-Time Predictive Analytics into SAP Applications [online], Dec. 30, 2009 [retrieved on Sep. 29, 2011], Retrieved from the Internet: URL:http://www.sdn.sap.com/irj/scn/go/portal/prtroot/docs/library/uuid/a07faefd-61d7-2c10-bba6-89ac5ffc302c?QuickLink=index&overridelayout=true>.

(Continued)

*Primary Examiner* — Farhan Syed

(74) *Attorney, Agent, or Firm* — Fish & Richardson P.C.

(57) ABSTRACT

A computer-implemented method includes obtaining a database table, the database table including data arranged in a plurality of rows and a plurality of columns, each column of data being associated with a different tag that specifies a category for data in the column, using one or more processors to identify a first predictive model, from a collection of predictive models, that can be applied to the database table to generate a predictive output, in which identifying the first predictive model is based on one or more of the different tags, adding a name associated with the first predictive model to a set of names of predictive models that are compatible with the database table, and providing the set of names of predictive models to a client device.

33 Claims, 12 Drawing Sheets

(56) References Cited

U.S. PATENT DOCUMENTS

| | | | |
|---|---|---|---|
| 7,899,611 B2 | 3/2011 | Downs et al. | |
| 7,912,628 B2 | 3/2011 | Chapman et al. | |
| 7,930,266 B2 | 4/2011 | Tuv et al. | |
| 7,970,721 B2 | 6/2011 | Leskovec et al. | |
| 7,979,365 B2 | 7/2011 | Goldberg et al. | |
| 8,027,854 B2 | 9/2011 | Baggett et al. | |
| 8,065,073 B2 | 11/2011 | Downs et al. | |
| 8,065,659 B1 | 11/2011 | Prince et al. | |
| 8,090,524 B2 | 1/2012 | Chapman et al. | |
| 8,250,009 B1* | 8/2012 | Breckenridge et al. | 706/14 |
| 2002/0099730 A1 | 7/2002 | Brown et al. | |
| 2003/0145000 A1 | 7/2003 | Arning et al. | |
| 2003/0176931 A1 | 9/2003 | Pednault | |
| 2003/0212851 A1 | 11/2003 | Drescher et al. | |
| 2005/0234753 A1 | 10/2005 | Pinto et al. | |
| 2007/0265713 A1* | 11/2007 | Veillette et al. | 700/30 |
| 2008/0097937 A1* | 4/2008 | Hadjarian | 706/12 |
| 2008/0154821 A1 | 6/2008 | Poulin | |
| 2008/0270363 A1* | 10/2008 | Hunt et al. | 707/3 |
| 2008/0288209 A1* | 11/2008 | Hunt et al. | 702/179 |
| 2008/0288889 A1* | 11/2008 | Hunt et al. | 715/810 |
| 2008/0294372 A1* | 11/2008 | Hunt et al. | 702/179 |
| 2008/0294996 A1* | 11/2008 | Hunt et al. | 715/739 |
| 2008/0319829 A1* | 12/2008 | Hunt et al. | 705/10 |
| 2009/0006156 A1* | 1/2009 | Hunt et al. | 705/7 |
| 2009/0018996 A1* | 1/2009 | Hunt et al. | 707/2 |
| 2009/0106178 A1 | 4/2009 | Chu | |
| 2010/0049538 A1* | 2/2010 | Frazer et al. | 705/1 |
| 2010/0100826 A1 | 4/2010 | Hawthorne et al. | |
| 2011/0145175 A1 | 6/2011 | Agarwal | |
| 2011/0289025 A1 | 11/2011 | Yan et al. | |
| 2011/0313900 A1 | 12/2011 | Falkenborg et al. | |
| 2012/0191630 A1* | 7/2012 | Breckenridge et al. | 706/12 |
| 2012/0239613 A1* | 9/2012 | Danciu et al. | 707/603 |

OTHER PUBLICATIONS

Hutter, et al., "Performance Prediction and Automated Tuning of Randomized and Parametric Algorithms," Principles and Practice of Constraint Programing, Lecture Notes in Computer Science, 2006, 15 pages.
SAS Rapid Predictive Modeler, Overview, 2010, 4 pages.
Postema, et al., "A Decision Support Tool for Tuning Parameters in a Machine Learning Algorithm", Nanyang Techonological University, 1997, 9 pages.
"Active learning (machine learning)," Wikipedia, the free encyclopedia, [online] [retrieved on Sep. 8, 2011]. Retrieved from the Internet: http://en.wikipedia.org/wiki/Active_learning_(machine learning), 3 pages.
Google: "Google prediction API: Prediction v1.2 reference", Google Developers, 2012, retrieved from the Internet: URL: https://developers.google.com/prediction/docs/reference/v1.2/reference [retrieved on Jul. 27, 2012].
T. Green, et al.: "Prediction API: Every app a smart app", Google Developers Blog, Apr. 21, 2011, Retrieved from the Internet: URL:http//googledevelopers.blogspot.nl/2p/11/04/prediction-api-every-app-smart-app.html [retrieved on Jul. 27, 2012].
Google: "Google prediction API", Google Code, 2010, retrieved from the Internet: URL: http://code.google.com/apis/predict/ [retrieved on May 22, 2010].
International Search Report and Written Opinion for PCT Application Serial No. PCT/US2012/035862, search report completed Aug. 7, 2012, mailed Aug. 16, 2012, 112 pages.
P. Chanezon, et al.: "Google cloud for data crunchers", O'Reilly Strata Conference: Feb. 1-3, 2011 (Santa Clara, CA), Feb. 2, 2011, XP55034662, Retrieved from the Internet: URL:http://cdn.oreillystatic.com/en/assets/1/event/55/Google_Cloud_for_Data_Crunchers Presentation.pdf [retrieved on Jul. 27, 2012]; the whole document.
Cyclic Measures: "Google prediction API WinForm GUI demo", YouTube, Oct. 8, 2010, XP55034570, Retrieved from the Internet: URL:http://www.youtube.com/watch?v=m9k-zuA1PYI (retrieved on Jul. 27, 2012]; the whole document.
Google: "Google apps script: User Guide", Google Code, 2010, XP55034664, Retrieved from the Internet: URL:http://code.google.com/googleapps/apps script/guied.html [retrieved on Jan. 27, 2011] Building a User Interface.
Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL: http://ladisworkshop.org/sites/default/files/LADIS%202010%20actual.pdf>, 43 pages.
Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.
R-Project web pages, 190 pages [online]. [Retrieved on May 18, 2010]. Retrieved from the Internet: <URL: http://www.r-project.org/>, 190 pages.
Uclassify web pages, [online] [Retrieved on May 18, 2010]. Retrieved from the Internet: <URL: http://www.uclassify.com/>, 16 pages.
Zementis web pages [online]. [Retrieved on May 18, 2010]. Retrieved from the Internet: <URL: http://www.zementis.com/>, 34 pages.
PMML 4.0 General Structure of a PMML Document, [online] [Retrieved on May 1, 2011]. Retrieved from the Internet: <URL: dmg.org/v4-0-1/General Structure.html>, 9 pages.
Predictive Model Markup Language, [online] [Retrieved on May 1, 2011], Retrieved from the Internet: <URL:http://en.wikipedia.org/wiki/Predictive_Model_Markup_Language>, 7 pages.
Developer's Guide—Google Prediction, [online] [Retrieved on May 6, 2011], Retrieved from the Internet: ,URL: http:www.google.com/.../developer-guide.htm>, 7 pages.
Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.
Netuitive Announces Amazon EC2 Integration for Hybrid Cloud Performance Management [online] [retrieved on Apr. 26, 2011], Retrieved from the Internet: <URL: marketwire.com/.../Netuitive-Announc . . . >, 2 pages.
Google Apps Script Overview [online] [retrieved on May 6, 2011], Retrieved from the Internet: <URL: code.google.com/.../guide.html>, 4 pages.
"Google Prediction API (Labs)", Google.com, [Retrieved on May 4, 2011]. Retrieved from the Internet: <URL: http://code.google.com/apis/predict/>, 1 page.
Creative Commons Attribution-Share Alike 3.0 Unported, Cross-validation (statistics)., http://creativecommons.org., pp. 1-5.
Creative Commons Attribution-Share Alike 3.0 Unported, Winnow (algorithm)., http://creativecommons.org., 2 pages.
Bengio, Yoshua, Continuous Optimization of Hyper-Parameters, C.P. 6128 Succ. Centre-Ville, Montreal, Quebec, Canada, H3C 3J7, 7 pages.
Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, 12 pages.
C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: htp://www.gaussianprocess.org/gmpl/chapters/RW5.pdf, 24 pages.
R. Duin, "The Combining Classifer: to Train or Not to Train?", IEEE Pattern Recognition, 2002 Proceedings, 16 International Conference, pp. 765-770.

(56) References Cited

OTHER PUBLICATIONS

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, vol. 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

\* cited by examiner

300

| E-Mail Subject Line | E-Mail Classification |
|---|---|
| "You have won $$$" | "spam" |
| "Lose weight fast!" | |
| "Lowest interest rates ever!" | "spam" |
| "How are you?" | "not spam" |
| "Trip to New York" | "not spam" |

PREDICTIVE ANALYTICAL MODEL SELECTION

CROSS-REFERENCE TO RELATED APPLICATIONS

The present application claims the benefit of U.S. Provisional Patent Application Ser. No. 61/530,252, filed Sep. 1, 2011, the disclosure of which is hereby incorporated by reference in its entirety.

BACKGROUND

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data.

SUMMARY

This specification relates to predictive analytical modeling selection for application software including database management systems. In some implementations, predictive analytical modeling selection can be employed to efficiently locate and identify one or more predictive models that are compatible with an input dataset. Furthermore, predictive analytical modeling selection can, in some implementations, be used to identify one or more predictive models that take, as input, features similar to but different from the features of an input dataset. Alternatively, or in addition, predictive analytical modeling selection can be used to rank models according to a level of compatibility with an input dataset.

In general, one aspect of the subject matter described in this specification can be embodied in a computer-implemented method, in which the method include obtaining a database table, the database table including data arranged in multiple rows and multiple columns, each column of data being associated with a different tag that specifies a category for data in the column, using one or more processors to identify a first predictive model, from a collection of predictive models, that can be applied to the database table to generate a predictive output, in which identifying the first predictive model is based on one or more of the different tags, adding a name associated with the first predictive model to a set of names of predictive models that are compatible with the database table, and providing the set of names of predictive models to a client device.

Another aspect of the subject matter described in this specification can be embodied in a system including one or more computing devices configured to perform operations including obtaining a database table, the database table including data arranged in multiple rows and multiple columns, each column of data being associated with a different tag that specifies a category for data in the column, identifying, based on one or more of the different tags, a first predictive model, from a collection of predictive models, that can be applied to the database table to generate a predictive output, adding a name associated with the first predictive model to a set of names of predictive models that are compatible with the database table, and providing the set of names of predictive models to a client device.

Another aspect of the subject matter described in this specification can be embodied in a storage medium having instructions stored thereon that, when executed by data processing apparatus, cause the data processing apparatus to perform operations that include obtaining a database table, the database table including data arranged in multiple rows and multiple columns, each column of data being associated with a different tag that specifies a category for data in the column, identifying, based on one or more of the different tags, a first predictive model, from a collection of predictive models, that can be applied to the database table to generate a predictive output, adding a name associated with the first predictive model to a set of names of predictive models that are compatible with the database table, and providing the set of names of predictive models to a client device.

These and other aspects can optionally include one or more of the following features. In some implementations, the method or operations can further include applying the first predictive model to the database table to obtain a predicted value, and adding the predicted value to the database table. Adding the predicted value to the database table can include replacing a missing column value in the database table. Adding the predicted value to the database table can include adding a new column to the database table, the new column including the predicted value.

In some implementations, identifying the first predictive model includes identifying a predictive model configured to: receive, as an input, data in a category specified by at least one of the different tags; and output data in a category specified by a second tag. The method or operations can further includes using the one or more processors to identify a second predictive model from the collection of predictive models, the second predictive model being configured to receive, as an input, both data in a category specified by at least one of the different tags and data in a category specified by the second tag, and adding a name associated with the second predictive model to the set of names of predictive models that are compatible with the database table. The method or operations can further include applying the first predictive model to the database table to obtain a predicted value, adding the predicted value to the database table in a new column to obtain an updated database table, and subsequently applying the second predictive model to the updated database table.

In some implementations, identifying the first predictive model based on one or more of the different tags includes identifying a predictive model configured to receive, as an input, data in a category specified by a second tag related to at least one of the different tags. The second tag can be superior to or subordinate to the at least one of the different tags in a hierarchal order of tags.

The details of one or more embodiments of the invention are set forth in the accompanying drawings and the description below. Other features and advantages of the invention will be apparent from the description and drawings, and from the claims.

DESCRIPTION OF DRAWINGS

FIG. 3 is a schematic that illustrates an example of a database table.

DETAILED DESCRIPTION

A web application is software that executes on one or more server computing devices (or "servers") and that is accessed over a network such as the Internet by users through web browsers or other software that runs on client computing devices (or "clients"). Data files include digital electronic files that are created, accessed, or modified by web applications and can be stored in repositories that are accessible to the servers. Web applications can provide a graphical user interface (GUI) to client devices by sending the client devices Hypertext Markup Language (HTML) documents or other information that can be used to render the GUIs. In some implementations, a web application is invoked and/or controlled using scripts written in a scripting language. A script is a set of instructions and/or queries that are written in the scripting language and that can be executed entirely on a client, entirely on a server, or on both the client and the server.

In some implementations, web applications run or utilize databases and include, for example, database management systems, word processors, email, financial tools, calendars, maps, and webpage-hosting applications. A database management system is a system that stores and manages data in a collection of one or more tables (e.g., database tables), each table having an array of rows and columns. By way of illustration, an to application programming interface (API) for a database management system can provide methods for reading, writing and creating database files, performing calculations on data in the database tables, and, in some implementations, manipulating a database GUI such as, for instance, by opening dialog boxes, creating new database tables, expanding or reducing the size of database tables, and/or joining pre-existing database tables. The API for the database management system also provide methods for can reading, writing or otherwise modifying the data contained in the row or column fields of the database tables.

In addition to accessing web application functionality in scripts, a predictive modeling API can be provided, in which the predictive modeling API allows use of predictive models to obtain a predicted output based on a particular input dataset. The predictive modeling API can also be used to programmatically train of new predictive models. The predictive modeling API allows users to upload a dataset from web application database files (or from other sources of data) and invoke a predictive model to obtain predictions for queries. In various implementations, a prediction (i.e., the output of a predictive model) is either a numeric value or a categorization of a query. The predicted output then can be added back to the input dataset to replace a missing value or to expand the input dataset. Alternatively, or in addition, the predictive modeling API can use the dataset as training samples for training new predictive models.

Figure 1:
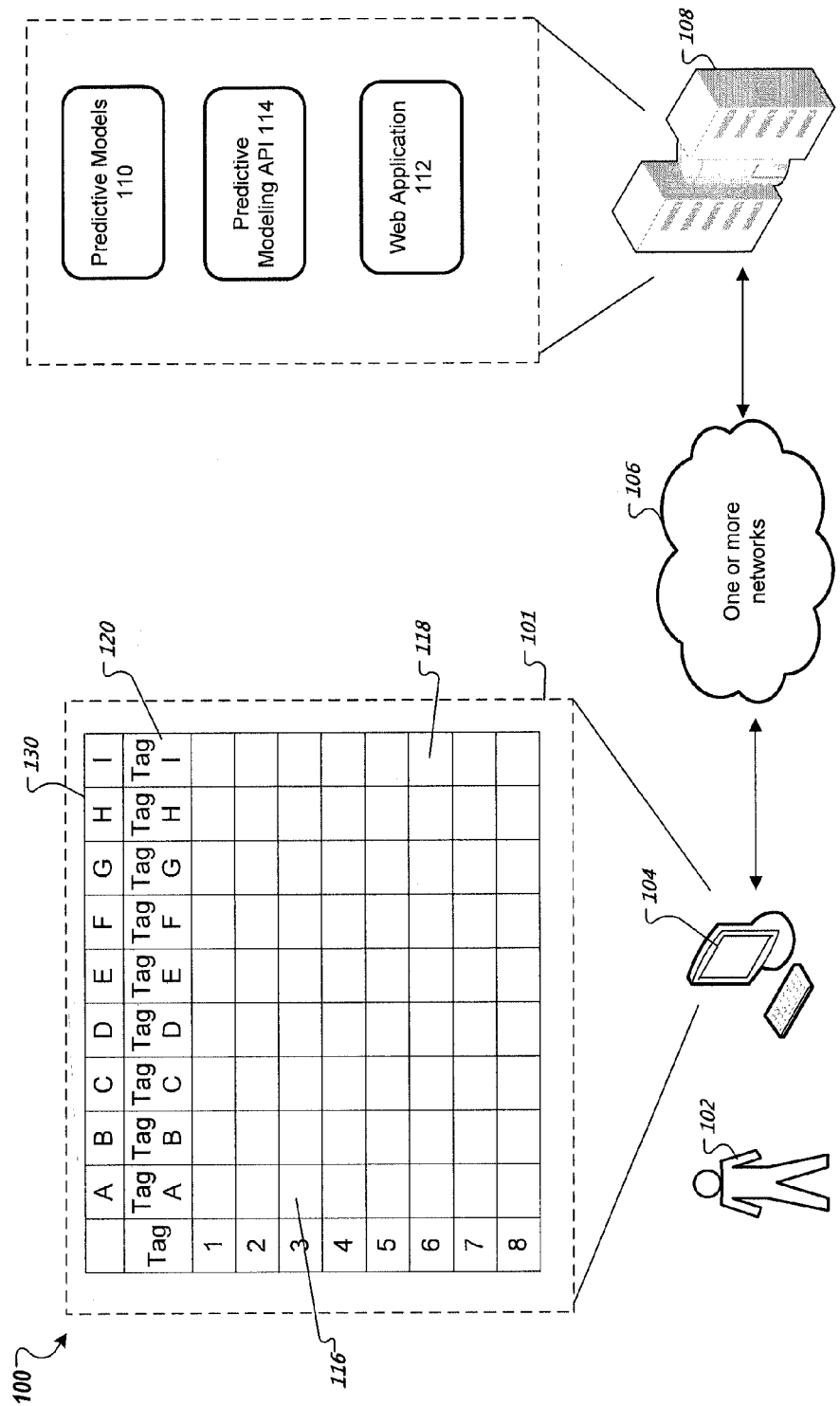
FIG. 1 is a schematic that illustrates use of an example predictive modeling API in conjunction with an example database web application.

FIG. 1 is a schematic that illustrates use of an example system 100 that employs predictive models. The system 100 includes a web application 112, a predictive modeling API 114 and predictive models 110. The web application 112, predictive modeling API 114 and predictive model 110 software can be stored and/or execute on one or more servers in a data warehouse 108, for example, that houses hundreds or thousands of servers. In further implementations, the servers can be located in different geographic locations. In some embodiments, the web application 112 provides an interactive GUI 101 through a computer network 106 such as the Internet to software (e.g., a web browser) executing on a client computing device 104. The GUI 101 is displayed for a user 102 and allows the user 102 to interact with the web application 112. For example, in some implementations, the GUI 101 displays interactive fields through which a user 102 can either upload a database file from the computing device 104 to the web application 112 or download a database file from the web application 112. In some implementations, the interactive fields can be used to enter data in or obtain data from the individual row or column fields of a database file. For example, the web application 112 may include a web hosting application that hosts a web page. The web page may include multiple interactive fields in which a user can enter data. The data entered in the interactive fields then may be saved to a database table that is stored with the web application 112 on one or more servers of the data warehouse 108 or another geographic location. The predictive modeling API 114 works in conjunction with the web application 112 to receive data from or send data to the web application 112 such as, for example, data from a database table or output data from a predictive model. The predictive modeling API 114 also can be used in conjunction with other applications that do not require the use of an interactive GUI. For example, in some implementations, database queries can be executed using a program that operates with a command line interface, such as UNIX or MS-DOS. Once a database file has been uploaded to or created in the web application 112, the database file (or, alternatively, data from the database file) can be passed to the predictive modeling API as input data. The predictive modeling API uses the input data to train a predictive model 110 or the predictive modeling API applies an already trained model to the data from the database file to produce a predicted output.

As explained above, a database includes one or more database tables 130, each of which can include data entry fields (e.g., fields 116 and 118) arranged in a two-dimensional array of rows and columns (e.g., columns A through I and rows 1-8). The data entry fields of the database table 130 include data values (e.g., a category value or a numeric value). In some implementations, a database table is missing a data value in one or more row and/or column data entry fields.

The columns of the database table 130 can be associated with tags 120 (Tag A through tag I). A tag 120 specifies the type of feature contained in the corresponding column with which the tag is associated. For example, a column in a database table can be associated with a tag entitled "temperature." The data entry fields of the column associated with the tag "temperature" thus respectively include, for example, numeric values corresponding to temperature values. In another example, a column in a database table can be associated with a tag entitled "city." The data entry fields of the column associated with the tag "city" respectively include, for example, city names. Accordingly, tags provide a mechanism for identifying the data values contained in the columns of a database table. Each column of a database table can therefore be associated with a different tag 120.

Figure 2:
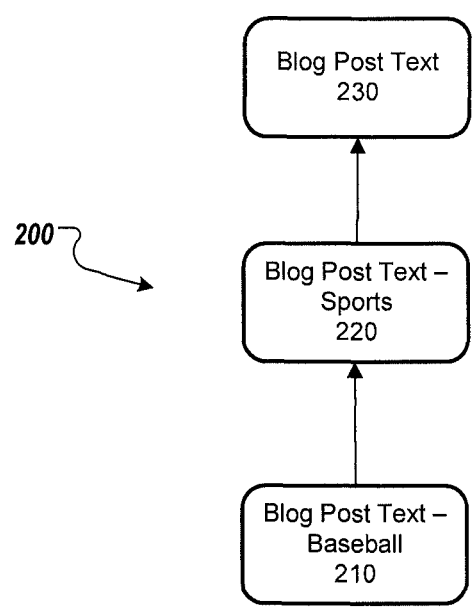
FIG. 2 is a schematic that illustrates an example of tags arranged in a tag hierarchy.

In some implementations, a tag associated with a dataset column can be part of a tag hierarchy. That is, a particular tag can be subordinate to or superior to other tags in a hierarchal order of tags. For instance, in some cases, a tag hierarchy can include tags arranged in order of specificity. As an example, FIG. 2 shows several tags arranged in a tag hierarchy 200. A tag 210 entitled "blog post text—baseball" may relate to text that can be found in a blog post and is concerned with the sport of baseball (e.g., a discussion of particular baseball team). The tag 210 then is subordinate to a tag 220 entitled "blog post text—sports," i.e., the tag 210 is more specific in that it relates to baseball and not sports generally. Similarly, a tag 230 entitled "blog post text" is superior to tag 220 i.e., the tag 230 is more general in that it relates to the text of blog posts in general and not the text of any particular blog post subject matter. The tag hierarchy may be stored, for example, on one or more servers in the data warehouse 108 or in another geographical location.

In some implementations, tags and corresponding tags in a tag hierarchy can be predefined. In some other implementations, tags and corresponding tags in a tag hierarchy can be determined using machine learning techniques. Some example feature tags include "zip code," "time," "date," and "text." For example, the "zip code" feature tag can include sub-tags "continent," "country," "state," "city." In another example, the "time" and "date" feature tags can include sub-tags "stock market events," "seismic events," and "weather events." The "text" feature tags can include sub-tags "news," "opinion," and "entertainment." In some implementations, sub-tags can include additional sub-tags. For example, sub-tags "news," "opinion," and "entertainment" can include additional sub-tags "magazine article," "blog post," and "newspaper."

Referring again to FIG. 1, upon receiving the dataset (e.g., database table 130) in the web application 112, the predictive modeling API 114 can invoke functionality of a predictive model 110 to obtain a predicted value for the dataset. For example, a predictive model can be invoked to calculate the value of at least one of the missing row and/or column fields in the dataset (e.g., database table 130). In some implementations, the predictive model can be used to add new data fields to the dataset (e.g., database table 130). For instance, the predictive model can predict values that are combined with a dataset that may or may not have missing values, such that the dataset is expanded in size. (The predictive model is described further below.)

As an example, the database table 130 uploaded to the web application 112 can be supplied to a predictive model 110 by the predictive modeling API 114. In various implementations, the predictive model to which the database table is supplied is either categorical (if its predictions are categories) or regression (if its predictions are numeric values). Accordingly, depending on the predictive model type, the output of the predictive model can be a category or numeric value that is added back to the database table to replace a missing value or as part of a new field that is added to the table.

By way of illustration, the example database table 300 in FIG. 3 includes data values in a first feature column 302 (entitled, "E-Mail Subject Line") that correspond to email message subject lines. The database table 300 also includes a second category column 304 (entitled "E-Mail Classification") that categorizes the data values contained in the corresponding row of the first column. One or more of the data entry fields in the second column 304 may be empty (e.g., field 306). When the data from the first column is supplied to a compatible predictive model (e.g., a predictive model that can take, as an input, e-mail subject lines), the predictive model generates a predicted value for each empty field in the second column 304. For example, the model may predict an output category indicative of whether the example represents SPAM or not. The predicted values can be placed in the empty field 306 of the second column 304. Alternatively, a database table can include feature columns containing numeric values and a category column that is a regression of those numeric values (e.g., next value in a series).

Referring again to FIG. 1, the action taken by the predictive model 110 can be, in some implementations, in response to a query (e.g., a request to predict the value of a missing row or column, a request to predict a value (category or numeric) to add to an existing database table, a request to locate a predictive model or predictive models capable of predicting a specified value, or a request to provide a recommendation of models compatible with an input dataset) submitted to the predictive modeling API 114 or the predictive model 110. In some implementations, the queries are automatically submitted to the predictive modeling API 114 or the model 110 in response to a database table being uploaded to the web application 112 (e.g., a script is executed such that the query is submitted to the predictive model 110 independent of a specific user request). Alternatively, in some implementations, a user uploading a database can request submission of the query to the predictive modeling API 114 or predictive model 110. For example, the user can select an option to submit a query through the GUI 100 (e.g., by clicking a link, checking a box, selecting an option from a drop-down menu).

In general, a predictive model is trained with training data that includes input data and output data that mirror the form of input data that will be entered into the predictive model and the desired predictive output, respectively. In some embodiments, there exists a collection of available predictive models to which an input dataset can be supplied. Thus, whether a particular predictive model in a collection of models would be compatible with a particular input dataset can depend on the type of features on which the model is trained and the type of features included in the input dataset supplied to the model. For instance, a predictive model is considered to be compatible with an input dataset when the types of features of the input dataset closely match the types of features on which the predictive model has been trained. That is, the predictive model takes, as an input, features in the same or similar categories as the features on which the model has been trained. In an example, a predictive model trained on a first type of data features (e.g., e-mail subject lines) can be considered to be compatible with an input dataset that includes, for example, e-mail subject lines in at least one of the input dataset columns. In contrast, the predictive model trained on e-mail subject lines would not be considered compatible with an input dataset that includes, for example, only zip codes in the input dataset columns.

In some implementations, a compatible model exactly matches an input dataset when the model takes as input the some or all of the same features associated with the columns of the input dataset in the same order the columns are arranged in the input dataset, and the model predicts the same output as the category column of the input dataset. For example, a predictive model that takes as an input features "city," "date," and "time of day" and predicts temperature values directly matches an input dataset having columns containing the same features in the same order (i.e., cities in the first feature column, dates in the second feature column, times of day in the third feature column, and temperature in a category column). In addition, a predictive model that takes as input features "city," "date," and "time of day" and predicts temperatures directly matches an input dataset having columns containing the two of those features in the same order (i.e., cities in the first feature column, dates in the second feature column, temperature values in a third category column). In some implementations, a compatible model indirectly matches an input dataset when the model takes as input at least some of the same input features associated with the columns of the input dataset, but not necessarily in the same order. For example, a predictive model that takes as an input features the values "city," "date," and "time of day" in that order indirectly matches an input dataset having a first column containing date data and a second column containing city data, but no column containing time of day values.

However, the number of predictive models to select from for a particular input dataset may be too large for a user to efficiently and manually search. Alternatively, or in addition, one or more of the features that a predictive model takes as input may not match exactly with the type of features available in the input dataset. For example, an input dataset may include features in a column corresponding to blog post text, but the models available have been trained on text in general or blog post text specific to a particular category, such as sports. Accordingly, it may not be clear which predictive models are compatible with an input dataset. The user can submit queries to the web application, which are passed to the predictive modeling API, for recommendations of predictive models that exactly or indirectly match an input dataset (e.g., a user can inquire as to what predicted outputs can be obtained from the input dataset). Alternatively, or in addition, the user can submit queries to the web application, which are passed to the predictive modeling API, for recommendations of models that supply a desired predicted output based on the input dataset (e.g., a user can inquire as to what predicted models are required to obtain a temperature prediction for the input dataset).

In response to the queries, the predictive modeling API can be configured to search a collection of predictive models for one or more models that are compatible with an input dataset received from the web application or to provide recommendations for models that can be used to obtain the desired predicted output. Once the compatible predictive models are identified, a set containing the names of those models can be provided, for example, to one or more client devices. As explained above, the type of features included in the columns of an input dataset can be classified using a tag. Accordingly, to identify whether a predictive model is compatible with a particular input dataset, the tags associated with the columns of the input dataset can be checked against the features that the predictive model takes as input (i.e., the tags associated with the dataset on which the particular predictive model has been trained). When a predictive model is trained on a training dataset, the tags associated with the columns of the training dataset can be recorded by the predictive model.

Figure 4:
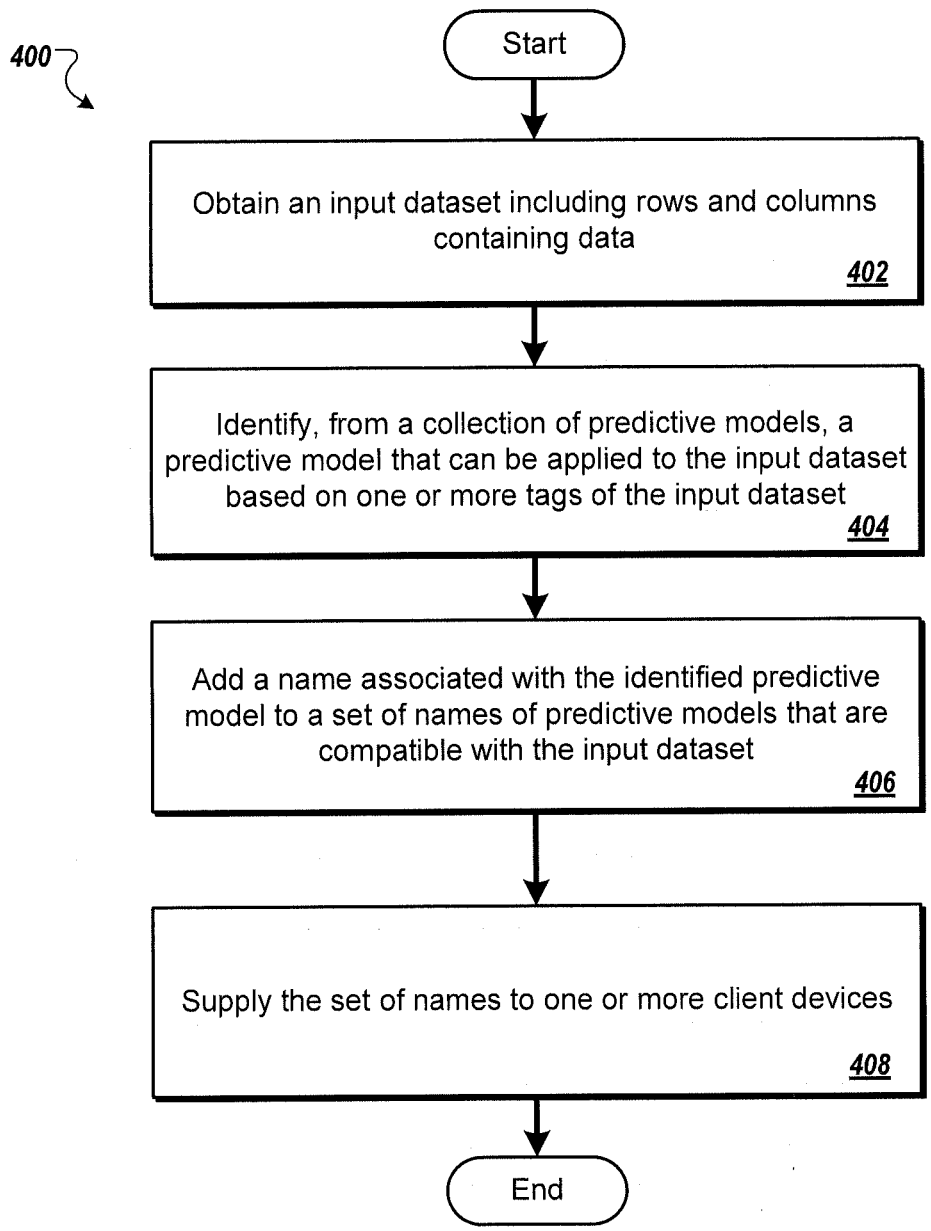
FIG. 4 is a flow chart of an example process for identifying one or more predictive models that are applicable to an input dataset.

FIG. 4 is a flow chart of an example process 400 for identifying one or more predictive models that are compatible with an input dataset, in which the process is implemented using one or more computer programs executing on one or more data processing apparatus such as the system show in FIG. 1. A database table is obtained (402) by the web application 112, in which the table includes data arranged in multiple rows and multiple columns, the columns of data being associated with different respective tags that classify the type of features contained in a corresponding column of the table. The database table is passed from the web application 112 to the predictive modeling API 114, which then obtains the tags identifying the features in the columns of the input dataset. The predictive modeling API 114 then identifies (404) a first predictive model, from a collection of predictive models 110, that can be applied to the input dataset to generate a predictive output, in which identifying the first predictive model is based on one or more of the different tags. After identifying the first predictive model that can be applied to the input dataset, the predictive modeling API 114 adds (406) a name associated with the first predictive model to a set of names of predictive models that are compatible with the dataset. For example, each predictive model can include a corresponding name that characterizes a potential use or predicted output of the model. In some implementations, the set of names of predictive models that are compatible with the input dataset may initially be empty prior to the search by the API. Once the search is completed, the predictive modeling API 114 passes the set of names of compatible predictive models to the web application 112, which then supplies (408) the set of names to one or more client devices 104. Upon receiving the set of names, the user(s) operating the one or more client devices can select a predictive model from the set to apply to the input dataset.

Figure 5:
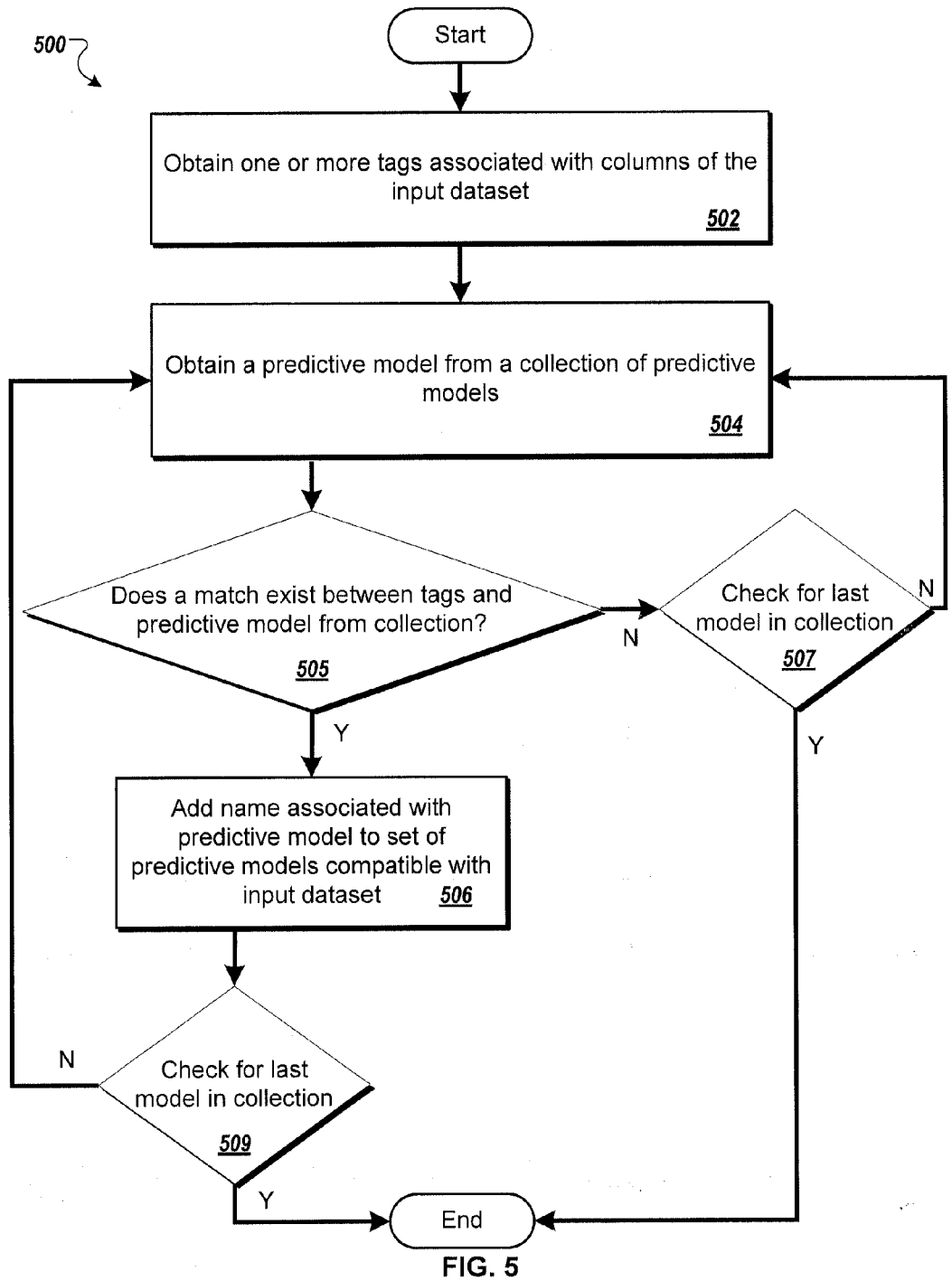
FIG. 5 is a flow chart of an example process for identifying a predictive model.

FIG. 5 is a flow chart of an example process 500 that further details the technique (404) for identifying a predictive model disclosed in the process 400. Upon receiving the input dataset from the web application 112, the predictive modeling API 114 obtains (502) one or more of the tags associated with the columns of the input dataset. For example, in some implementations, the predictive modeling API 114 extracts the tags associated with the columns of the input dataset. In some implementations, a user operating the client device 104 selects, through the web application 112, which tags of the input dataset should be used to perform the search for predictive models. The tags selected by the user then are passed to the predictive modeling API 114.

The predictive modeling API 114 then obtains (504) one of the predictive models 110 from a collection of predictive models. Once the predictive modeling API 114 has obtained the one or more tags associated with the input dataset, the API 114 checks (505) a predictive model in the collection of predictive models 110 to determine if there is a match between the tags obtained from the input dataset and the tags associated with the first predictive model. If a match between tags exists, the API 114 adds (506) a name associated with the predictive model to a set of compatible predictive models. If no match exists, the API 114 obtains (504) the next predictive model in the collection and performs another check (505) of the tags associated with the input dataset against the tags associated with the new predictive model, thus continuing the algorithm. In either case, the API 114 determines (507, 509) if the most recent predictive model checked is the last available in the collection. If no more models are available to check, the API 114 ends the search. Otherwise, the API 114 continues checking the remaining models in the collection.

Figure 6A:
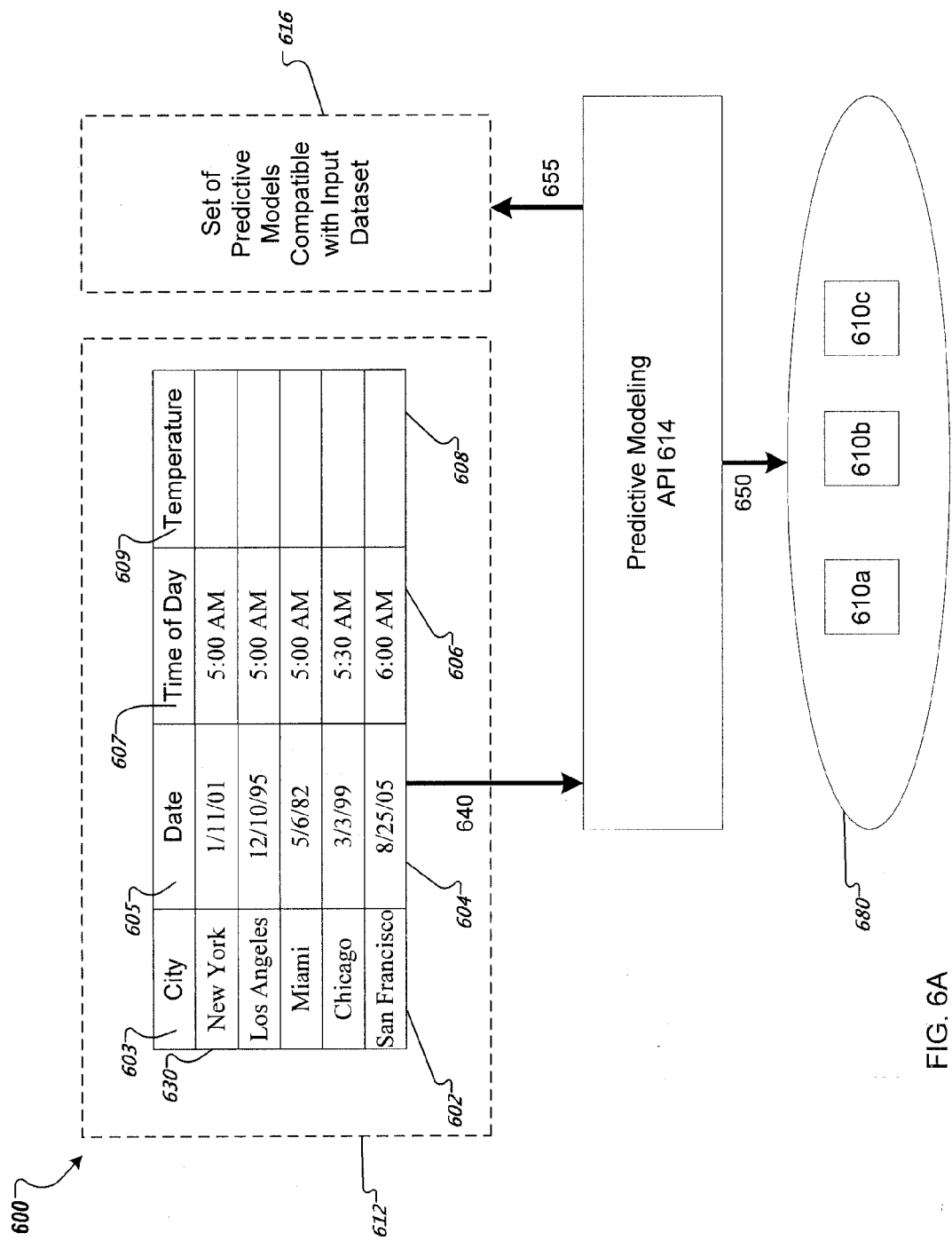
FIG. 6A is a schematic that illustrates an example of a system used to obtain a list of predictive models compatible with an input dataset.

In some embodiments, checking whether tags associated with an input dataset match tags associated with a predictive model entails comparing whether the predictive model takes as input the features identified by the input dataset tags, without preference to the column order from which the tags were obtained. For example, FIG. 6 is a schematic that illustrates an example of a system 600 used to obtain a list of predictive models compatible with an input dataset according to a first embodiment. An input database table 630 includes three feature columns 602, 604, 606 and a category column 608. The first feature column 602 includes data specifying a geographic location, e.g., a city. The first feature column 602 is associated with a corresponding tag 603 entitled, "City." The second feature column 604 is directly adjacent to the first feature column and includes data specifying a date, e.g., a day and month of the year. The second feature column is associated with a corresponding tag 605 entitled, "Date." The third feature column 606 is directly adjacent to the second feature column and includes data specifying a time of day. The third feature column is associated with a corresponding tag 607 entitled, "Time of Day." The category column is located at the end of the database table 603 and is directly adjacent to the third feature column 606. The rows of the category column 608 include data specifying a temperature for the corresponding city, date and time of day. The category column is associated with a tag 609 entitled, "Temperature." The tags of the input dataset are provided (640) from the web application 612 to a predictive modeling API 614.

When conducting a search of applicable models for the input dataset 630, the predictive modeling API 614 checks (650) whether the tags 603, 605 and 607 match tags associated with a predictive model in a collection 680 of predictive models (e.g., model 610a, 610b, 610c). That is, the API 614 searches for a model that takes as an input city, date and time data values, without respect to the order of the tags, and outputs a temperature value as a predicted output. If the API 614 locates a model 610a that takes, as an input, the features of the database table 630 in a different column order (e.g., a first column of values corresponding to a time of day, a second column of values (directly adjacent to the first column) corresponding to a city name, and a third column of values (directly adjacent to the second) corresponding to date values), where the model outputs a predicted temperature, the API 614 identifies the located model 610a as compatible with the input database table 630 and adds (655) the name of model 610a to a set 616 of compatible predictive models. The set 616 can be stored with the web application 112 on one or more servers of the data warehouse 108 or on servers in some other geographic location, in which the servers can communicate over one or more networks with the web application 112 and/or predictive modeling API 114.

In some implementations, the predictive modeling API can identify compatible predictive models when less than all of the feature columns of an input dataset match the features that a predictive model takes as input. For example, if input database table 630 includes two feature columns 602, 604 (e.g., a first feature column of values corresponding to city and a second feature column of values (directly adjacent to the first column) corresponding to a date) and a category column 608 (e.g., predicted temperature) but no third feature column, the API 614 can still identify a predictive model as compatible with the model 610a when model 610a takes as input city and date features and outputs a predicted temperature.

Figure 6B:
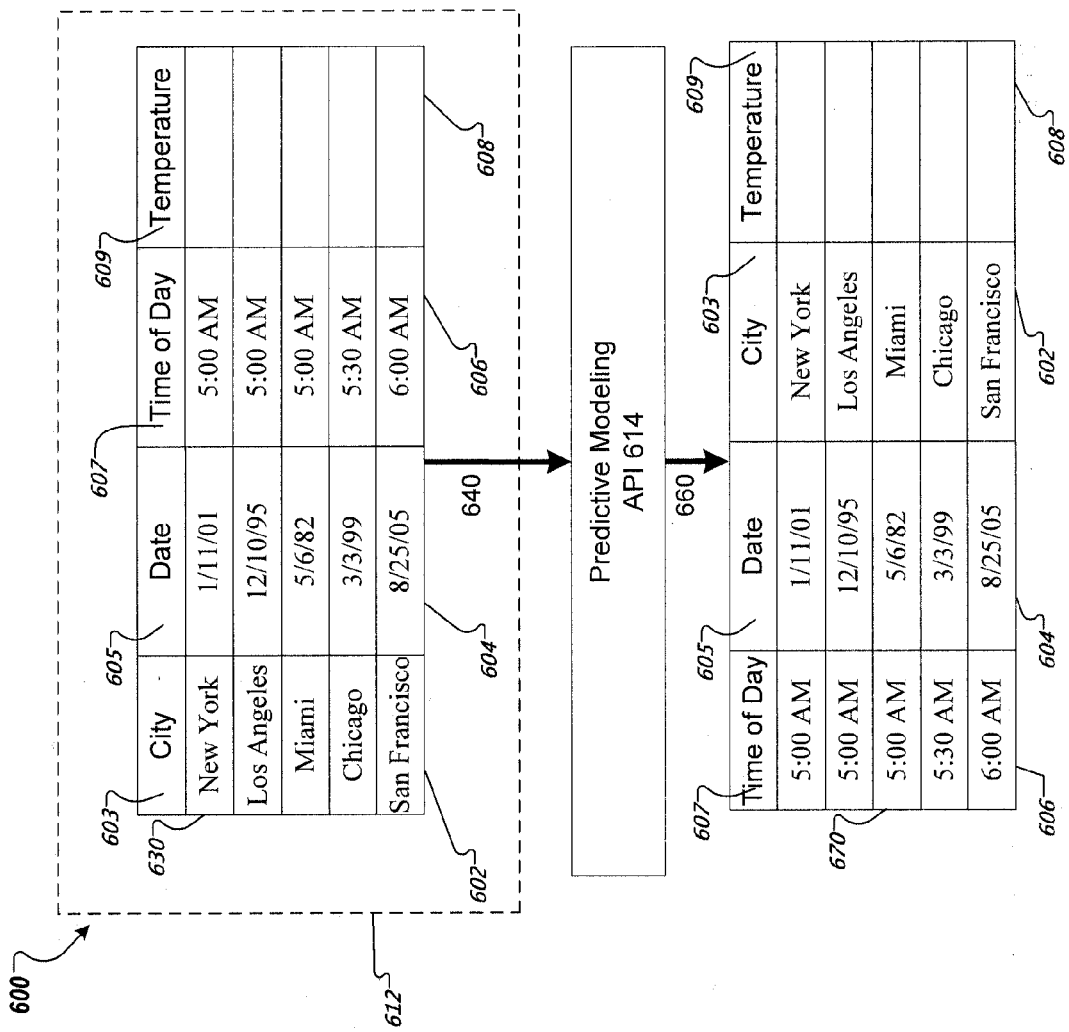
FIG. 6B is a schematic that illustrates an example of a system used to obtain a list of predictive models compatible with an input dataset.

In some embodiments, the predictive modeling API can re-order the tags associated with the columns of the input dataset to aid identifying a predictive model compatible with the input dataset. For instance, FIG. 6B is a schematic that illustrates an example of a system used to obtain a list of predictive models compatible with an input dataset according to a second embodiment. Again, a database table 630 from a web application 612 is provided (640) to a predictive modeling API 614. However, predictive modeling API switches (660) the order of tags associated with the table columns prior to searching for a compatible model. That is, the predictive modeling API modifies the order of tags associated with columns 602, 604, and 606 of database table 630 (e.g., switching the location of first column 602 with the third column 606) to produce a modified database table 670. The API then checks whether any predictive models in a collection of predictive models take, as an input, feature columns arranged in the same manner as the modified database table 670. If a compatible predictive model is located that can take the features in the modified order specified by the predictive modeling API, the predictive modeling API 114 then can re-order the arrangement of the columns of the input dataset to match the order in which the compatible predictive model will receive the features.

In some embodiments, a predictive model takes as input one or more features that do not match the name of a tag associated with a column of the input dataset. The predictive modeling API can still identify a predictive model that is compatible with the input dataset, if one or more of the model input features are, as part of a tag hierarchy, subordinate to or superior to the tag associated with the column of the input dataset.

Figure 7:
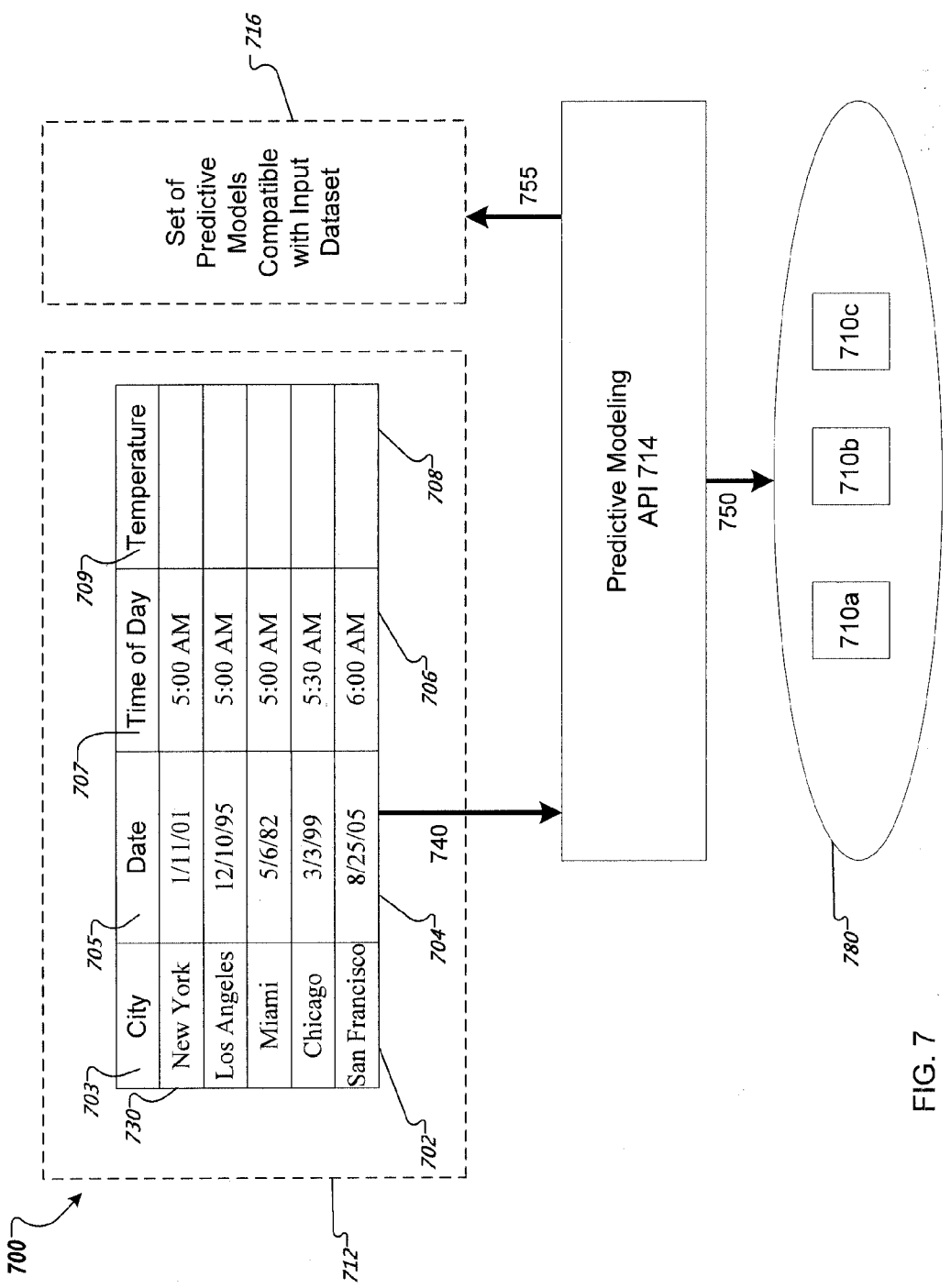
FIG. 7 is a schematic that illustrates an example of a system used to obtain a list of predictive models compatible with an input dataset.

FIG. 7 is a schematic that illustrates an example of a system 700 used to obtain a list of predictive models compatible with an input dataset according to a third embodiment. An input database table 730 is provided (740) from a web application 712 to a predictive modeling API 714. The input database table 730 includes three columns 702, 704, 706 and three respective tags 703, 705, and 707. The predictive modeling API 714 then searches (750) a collection 780 of available predictive models (e.g., 710a, 710b, 710c). In particular, the predictive modeling API 714 checks whether any of the predictive models in the collection 780 take as an input, features that match one or more of the tags 703, 705, and 707 or whether any of the predictive models in the collection 780 take as an input, features that are subordinate to or superior to one or more of the tags 703, 705, and 707. For example, if the tag 703 associated with column 702 of the input database table 730 corresponds to city names, the predictive modeling API 714 can search the collection of models for those models that take, as an input, features that include city names, as well as features that are subordinate to city names in a tag hierarchy, such as boroughs, city street names, or school districts. Other features that are subordinate to city names can be searched as well. The predictive modeling API also can search features that are superior to city names in a tag hierarchy, such as counties, states or countries. Other features that are superior to city names can be searched as well. Once predictive models are identified, the API 714 can add (755) the names associated with the identified models to a set 716 of predictive models compatible with the input database table 730.

In some embodiments, an input dataset lacks one or more feature columns that are required for applying a particular predictive model. For example, the predictive modeling API can identify a first predictive model that takes, as an input, three different features. However, the input dataset provided to the API can include columns associated with tags that match just two of the three features of the first predictive model. In such cases, the predictive modeling API can search for an additional model to apply to the input dataset to obtain the third missing feature and include both the first and second models in a set of applicable models. If an appropriate second model is located, the second model can be applied to the input dataset to obtain the third feature as a predicted output. The predicted output can be added to the input dataset to produce a modified input dataset. The modified input dataset then includes the three features required by the first predictive model, such that the first predictive model can be applied to the modified input dataset. That is, the second and first predictive models are "stacked," with the second predictive model being applied to the input dataset to obtain a modified input dataset, and the first predictive model subsequently being applied to the modified input dataset.

In some embodiments, a user submits a query for one or more models. For example, a user can supply an input dataset and request, through the web application, a recommendation for a list of models capable of taking the input dataset and outputting a desired output (a directed search), such as temperature. The predictive modeling API 114 can be configured to search a collection of predictive models, in response to such a request, for predictive models that take as input one or more of the features of the input dataset and output a predicted temperature value. Alternatively, or in addition, the API 114 can search for two or more predictive models that need to be applied in a "stack" to obtain the desired prediction. For example, the API 114 can identify a second model which provides the desired output but is not compatible with the input dataset because the input dataset is missing one or more feature columns. The API 114 then can also identify a second predictive model that can take the input dataset and output the missing feature values necessary to add to the input dataset. When the second model is applied to the input dataset, the predicted output can be added to the input dataset to obtain a modified dataset that is compatible with the first dataset.

Figure 8:
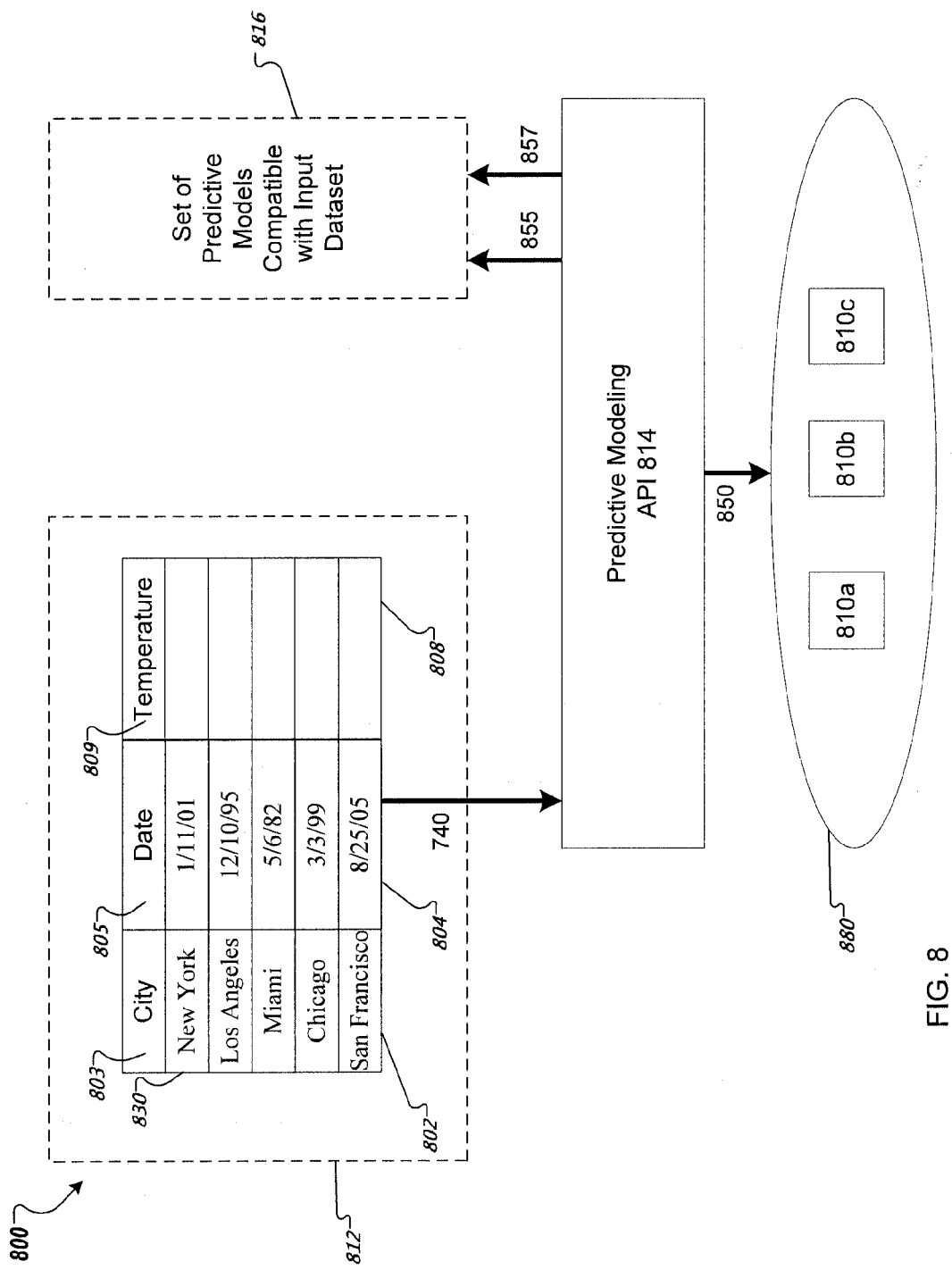
FIG. 8 is a schematic that illustrates an example of a system used to obtain a list of predictive models compatible with an input dataset.

FIG. 8 is a schematic that illustrates an example of a system 800 used to obtain a list of predictive models compatible with an input dataset according to a fourth embodiment. A first database table 830 includes two separate feature columns 802, 804 associated with respective tags 803, 805 that characterize the features stored in the corresponding columns (e.g., city name and date) and a category column 806 (e.g., temperature). The predictive modeling API obtains (840) from a web application 812 tags associated with the feature columns of the first database table 830 and searches (850) a collection 880 of predictive models (e.g., 810a, 810b, 810c) for models that are compatible with the first database table 830. From the collection 880, the predictive modeling API identifies a predictive model (e.g., model 810a) that takes, as an input, features corresponding to those identified by tags 803 and 805 (e.g., city name and date) and outputs a predicted temperature value. The predictive model 810 can also take as a third input, features that are missing from the input database table 830 (e.g., humidity).

Because the input database table 830 does not include a column of values identifying humidity, the predictive modeling API 814 also can search for a predictive model that will supply the missing column of features to the table 830. For example, the predictive modeling API 814 can locate a predictive model (e.g. 810b) that takes, as an input, features corresponding to those identified by tags 803 and 805 (e.g., city name and date) and outputs a predicted humidity. If such a model can be found in the collection 880, the predictive modeling API 814 can add (855) the name of the first model (e.g., 810a) and add (857) the second model (e.g., 810b) to a set 816 of names of models that are compatible with the input database table 830. When the set of models is passed to a client device, the user can apply the models in a "stack," i.e., the second predictive model (e.g., 810b) can be applied to the input database table 830 to obtain predicted humidity values, which are then added to the table 830. The first predictive model (e.g., 810a) then can be applied to the modified table that includes the humidity values to obtain predicted temperature values.

In some implementations, the user query can be a request to identify predictive models that are compatible with the input dataset (an undirected search). In response to the query, the API 114 can search for predictive models that exactly or indirectly match the input dataset, depending on the user identified preference. The API 114 thus lists models compatible with the input dataset informing the user what type of predictions can be obtained with the input dataset.

In some embodiments, the predictive models identified by the predictive modeling API can be ranked based on applicability to an input dataset. The set of predictive model names can be ranked based on how closely the features accepted by each model match tags associated with an input dataset. For example, the ranking may be based on: whether a predictive model takes as input feature columns that exactly match the names and order of tags associated with an input dataset; whether a predictive model takes as input feature columns that exactly match the names but not order of tags associated with an input dataset; whether a predictive model takes as input feature columns that match at least some of the names of tags associated with an input dataset; whether a predictive model takes as input feature columns that fall within the same hierarchal order as tags associated with an input dataset. Once the set of ranked predictive models is obtained, the set can be passed from the web application to the client device.

Figure 9:
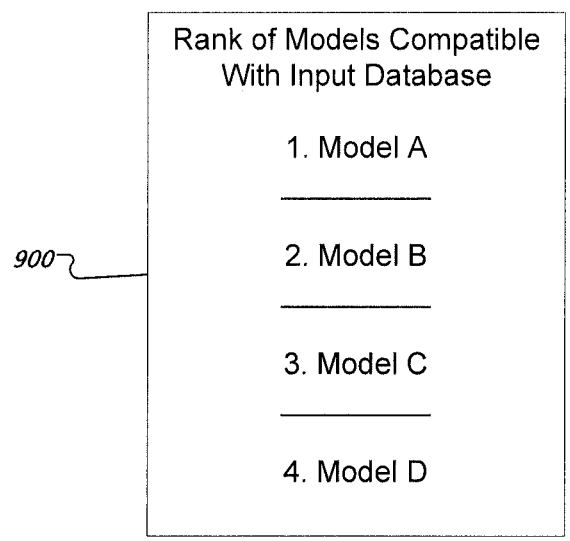
FIG. 9 is an example of a set of predictive model names obtained from a search performed by a predictive modeling API.

FIG. 9 is an example of a set 900 of predictive model names obtained from a search performed by a predictive modeling API, the models being identified by the API as compatible with an input database table. The input database table on which the search is based can include a tag associated with each feature column in the table. For example, the table can include a first tag labeled "city" and associated with a first feature column, a second tag labeled "date" and associated with a second feature column, and a third tag labeled "time of day" and associated with a third feature column.

The models in the set 900 are ranked in order from 1 to 4, with the model ranked 1 corresponding to the predictive model having the greatest applicability to the input database table among the models of the set 900. For example, model A, which is ranked 1, can be a predictive model that takes as input three feature columns that exactly match the name and order (e.g., column 1 contains city names, column 2 contains dates, column 3 contains times of day) of the tags associated with the input database table. Model B, which is ranked 2, and therefore less applicable to the input dataset, can be a predictive model that takes as input three features that exactly match the name, but not order (e.g., column 1 contains times of day, column 2 contains city names, and column 3 contains dates) of tags associated with the input database table. Model C, which is ranked 3, can be a predictive model that takes as input three features, in which the second and third inputs of the model receive data that matches the name and order of the second and third tags associated with the input database table (e.g., date and time). The first input of Model C can correspond to a feature that is in the same hierarchy (e.g., state) as the first tag of the input database table. Model D, which is ranked 4, can be a predictive model that takes as input three features, in which only the first and second inputs match the name, but not order of two of the tags (e.g., city and time) associated with the input database table. Each of the models in the set 900 can be capable or predicting an output that corresponds to the category column of the input database (e.g., each model can be capable of predicting a temperature).

Figure 10:
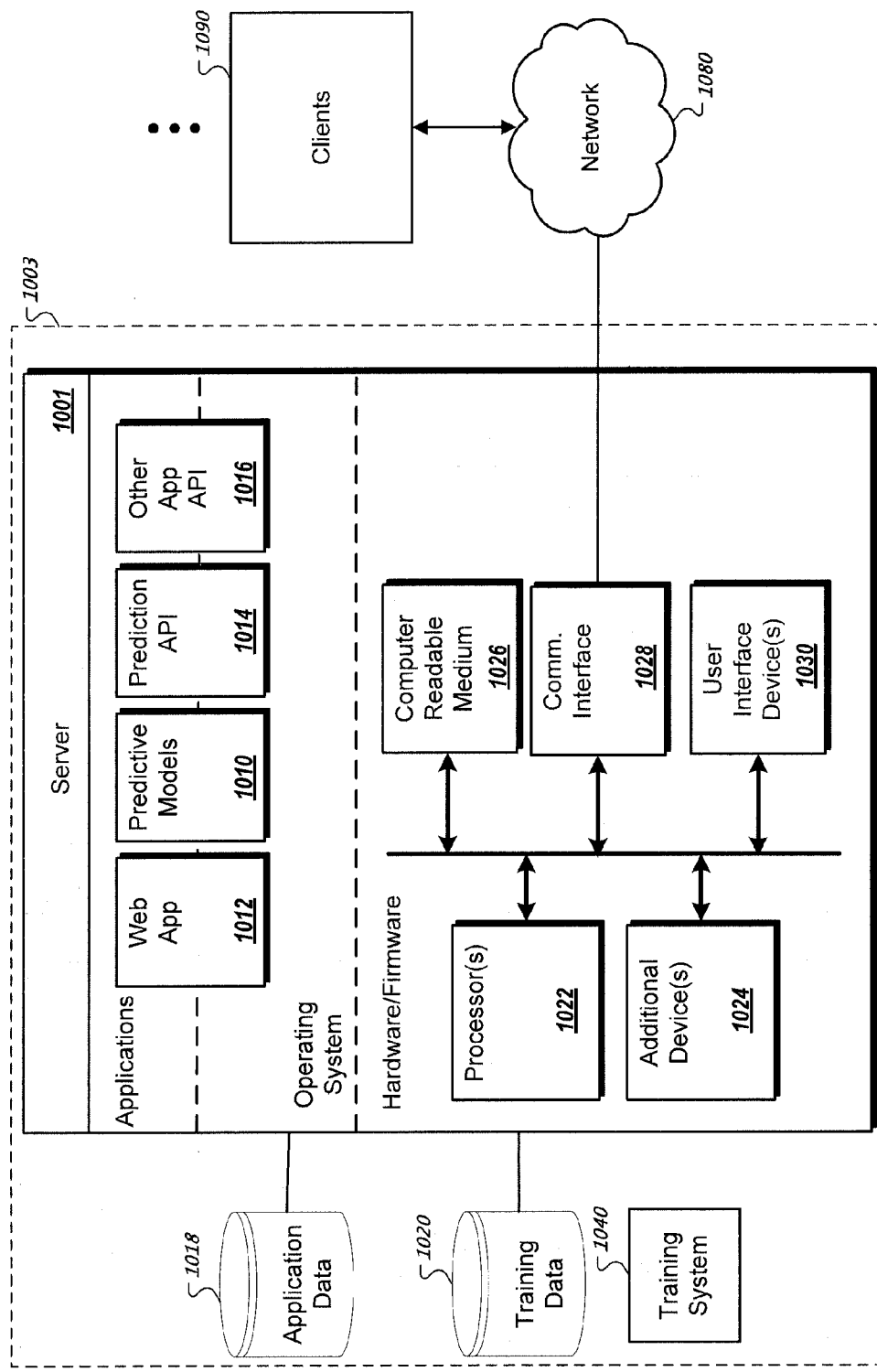
FIG. 10 illustrates an example predictive modeling system.

FIG. 10 illustrates an example predictive modeling system 1000. The system includes one or more clients 1090 that can optionally communicate through one or more networks 1080 with a collection of remote servers, such as servers (e.g., server 1001) deployed in a data center 1003 or in different geographic locations. The servers includes one or more data processing apparatuses. While only one processor apparatus is shown in FIG. 10, multiple data processing apparatus can be used. The servers include various software modules, e.g. executable software programs or libraries, including a web application 1012, predictive modeling API 1014, and predictive models 1010. Although several software modules are illustrated, there may be fewer or more software modules. Moreover, the software modules can be distributed on one or more data processing apparatus connected by one or more networks or other suitable communication mediums. A computer program can execute on a single server or, alternatively, the program can be organized into components that execute on multiple servers. There can be more than one instance or copy of a given computer program executing on the collection of servers at any given time. Multiple copies of a computer program that implements the predictive modeling API, for instance, can be executing at the same time on one or more servers. Other programs and APIs (e.g., API 1016) can be executed on the servers as well. The servers can communicate with each other and with storage systems (e.g., application data storage system 1018, database storage system 1020) at various times using one or more computer networks or other communication means. For example, the servers in the data center 1003 can be coupled to an intranet.

The servers also include hardware or firmware devices including one or more processors 1022, one or more additional devices 1024, a computer readable medium 1026, a communication interface 1028, and one or more user interface devices 1030. Each processor 1022 is capable of processing instructions for execution within the server 1001. In some implementations, the processor 1022 is a single or multi-threaded processor. Each processor 1022 is capable of processing instructions stored on the computer readable medium 1026 or on a storage device such as one of the additional devices 1024. The server 1001 uses its communication interface 1028 to communicate with one or more computers 1090, for example, over the network 1080. Examples of user interface devices 1030 include a display, a camera, a speaker, a microphone, a tactile feedback device, a keyboard, and a mouse. The server 1001 can store instructions that implement operations associated with the modules described above, for example, on the computer readable medium 1026 or one or more additional devices 1024, for example, one or more of a floppy disk device, a hard disk device, an optical disk device, or a tape device.

The predictive modeling API 1014 is a separate computer program or, in some implementations, is part of the computer program that makes up the web application 1012. The web application 1012 and the predictive modeling API can communicate through method invocation, shared memory, network communication, or other means of inter or intra-process communication. The predictive modeling system 1000 can optionally include other APIs as well (e.g. API 1016).

The predictive modeling API 1014 exposes functionality through objects, methods or functions that allow scripts to query models and train models 1010 using training data 1020 obtained from application data 1018. In some implementations, models are trained by a training system 1040, which receives requests from the predictive modeling API 1014 to initiate training and check the status of training. The predictive modeling API 1014 provides the training system 1040 with the location of training data 1020 to be used in training a particular model. For example, the training data 1020, such as a range of columns in a database table, can be obtained from the application data 1018 through use of the web application API 1012 and then provided to the training system 1040 through use of the predictive modeling API 1014.

Other APIs 1016 can include, for instance, an API that allows scripts to communicate over computer networks using Transmission Control Protocol/Internet Protocol (TCP/IP) and an authentication API which provides a mechanism for authorizing a script's request to access a user's application data 1018, models 1010, and training data 1020 through the web application 1012 and the predictive modeling API 1014. In some implementations, the web application 1012 (or, e.g., a script engine) requests access permission from an authorization server. The authorization server is responsible for prompting the user operating the client device(s) (e.g., clients 1090) for permission to grant access to the required data, if necessary. If permission is granted, the authorization server returns a token that can be shared with the web application 1012 (including, e.g., a web application API), and the predictive modeling API 1014 in order to access the required data. Other authorization mechanisms are possible.

Figure 11:
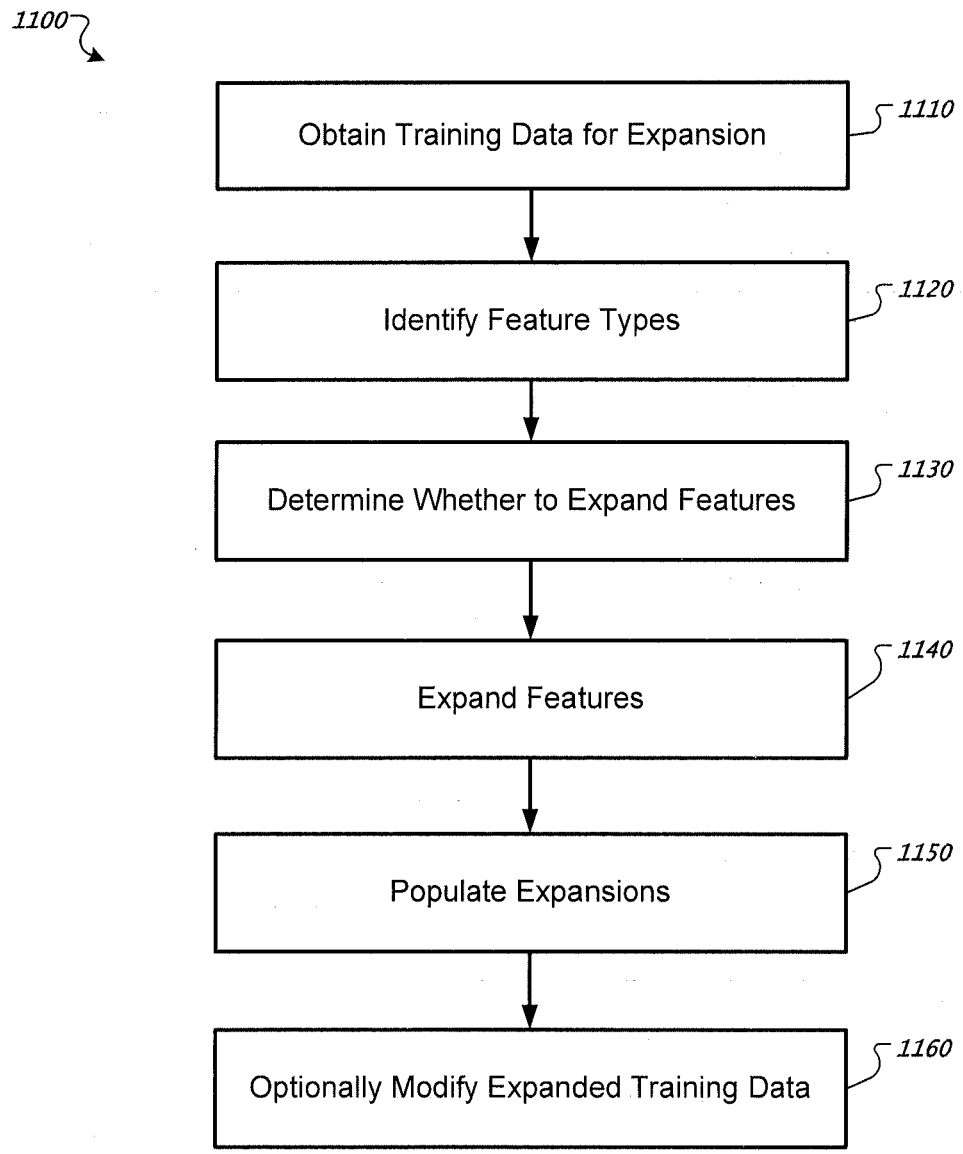
FIG. 11 is a flow chart of an example process for expanding a dataset.

FIG. 11 is a flowchart of an example process for expanding a dataset, in which the process is implemented using one or more computer programs executing on one or more data processing apparatus such as the system show in FIG. 1. Expansion of an input dataset can be useful to aid in identifying a compatible predictive model that will give a direct match. For example, if a predictive model is identified in which the model receives as input features data values corresponding to "states," but an input dataset instead contains global positioning values, the input dataset is not a direct match with the identified predictive model. However, if the input dataset can be expanded to include states corresponding to the listed global positioning values, the identified predictive model would then correspond to a direct match with the features of the input dataset.

As shown in FIG. 11, the predictive modeling API 114 obtains the dataset for expansion (1110). As explained above, the dataset can be, in some implementations, obtained from a client device or a database storing data. The predictive modeling API 114 identifies a tag for one or more features (1120). In some implementations, the predictive modeling API 114 evaluates each feature in the dataset to identify a tag. Feature types can be predefined, together with techniques for identifying those types. Example feature tags include "location," "zip code," "time," "date," and "text." Alternatively, or in addition, the predictive modeling API 114 can evaluate predictive models identified in a search for models compatible with the input dataset to identify a tag.

The predictive modeling API 114 determines whether to expand the identified features (1130). In some implementations, the system expands all features for which a tag was identified. For example, assuming the API 114 identifies a model that takes, as input, features having predefined tags for "time" and "date," the predictive modeling API 114 can expand any features that match these tags. According to this example, a dataset that includes features "time" and "temperature" will result in expansion of the feature "time," which matches predefined tag "time," but will not result in expansion of the feature "temperature," which does not match tag "time" or "date."

The predictive modeling API 114 then expands features (1140). In some implementations, the system expands all features for which a tag was identified. For example, if types "time" and "date" were designated as types for expansion, the system will expand any features that match either type "time" or "date." In some implementations, expansion of a feature can involve expanding that feature to all sub-types associated with the identified type. For example, a "GPS coordinates" feature can be identified as a "location" type and be expanded to some or all sub-types corresponding to the "location" type (e.g., "continent," "country," "state," "city," "zip code," "street," and "street address").

The system then populates the expansions (1150). In some implementations, values for expansions can be obtained from by applying to the dataset a predictive model compatible with an input dataset. The compatible predictive model can be obtained as a result of a search for a compatible predictive model. The system then populates the expansions using the predicted output from the compatible predictive model. In some implementations, values for expansions can be automatically determined using training data examples. In some implementations, training data examples for populating expansions can be obtained from a database storing training data sets. For example, a GPS coordinates feature (a "location" tag) can be expanded to sub-tags "state" and "city." The expanded sub-tags "state" and "city" can be populated using existing training data examples that include GPS coordinates, "state" and/or "city."

The system optionally modifies the expanded training dataset (1160). In some implementations, expanded training data can be modified by reduction expansions in the training data. The system can reduce expansions using feature selection techniques. In some implementations, the system reduces expansions by iteratively removing one expansion from the expanded training data and testing whether removal of that expansion resulted in a positive impact on the prediction outcome. The system can exclude an expansion from the training data if removal of the expansion improved the accuracy of the prediction outcome. In some other implementations, the system can reduce expansions by removing subsets of two or more expansions from the expanded training data and testing whether removal of that subset resulted in a positive impact on the prediction outcome. The system can exclude expansion subsets from the training data if removal of those subsets improved the accuracy of the prediction outcome.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    obtaining, over a network, a database table from a client device, the database table including data arranged in a plurality of rows and a plurality of columns, each column of data being associated with a different tag that specifies a category for data in the column, the different tag separate from a column name associated with each column of data;
    receiving a query to identify at least one predictive model compatible with the database table;
    in response to receiving the query, using one or more processors to identify, based on one or more of the different tags, a plurality of predictive models, from a collection of predictive models, that can be applied to the database table to generate a predictive output, at least one identified predictive model being trained on data selected from a group consisting of data associated with one or more categories related to categories specified by the different tags, data associated with the same categories specified by the different tags and arranged in a different order from the data of the database table, and combinations thereof;
    ranking the identified predictive models based on how closely categories of data accepted by each identified predictive model match the categories of data specified by the different tags, wherein the categories of data accepted by each identified predictive model are categories of data on which the identified predictive model has been trained;
    adding a name associated with at least one of the identified predictive models to a set of names of predictive models that are compatible with the database table; and providing the set of names of predictive models to the client device.

2. The computer-implemented method of claim 1, further comprising:
applying at least one of the identified predictive models to the database table to obtain one or more predicted values; and
adding the one or more predicted values to the database table.

3. The computer-implemented method of claim 2, wherein adding the one or more predicted values to the database table comprises replacing a missing column value in the database table.

4. The computer-implemented method of claim 2, wherein adding the one or more predicted values to the database table comprises adding a new column to the database table, the new column including at least one predicted value.

5. The computer-implemented method of claim 1, wherein identifying the plurality of predictive models comprises identifying a first predictive model configured to:
receive, as an input, data in a category specified by at least one of the different tags; and
output data in a category specified by a second tag.

6. The computer-implemented method of claim 5, wherein identifying the plurality of predictive models further comprises identifying
a second predictive model from the collection of predictive models, the second predictive model being configured to receive, as an input, both data in a category specified by at least one of the different tags and data in a category specified by the second tag; and
adding a name associated with the second predictive model to the set of names of predictive models that are compatible with the database table.

7. The computer-implemented method of claim 6, further comprising:
applying the first predictive model to the database table to obtain a first predicted value;
adding the first predicted value to the database table in a new column to obtain an updated database table;
subsequently applying the second predictive model to the updated database table to obtain a second predicted value; and
adding the second predicted value to the updated database table.

8. The computer-implemented method of claim 1, wherein identifying the plurality of predictive models comprises identifying a predictive model configured to receive, as an input, data in a category specified by a second tag related to at least one of the different tags.

9. The computer-implemented method of claim 8, wherein the second tag is superior to or subordinate to the at least one of the different tags in a hierarchal order of tags.

10. A system comprising:
one or more computing devices configured to perform operations including:
obtaining, over a network, a database table from a client device, the database table including data arranged in a plurality of rows and a plurality of columns, each column of data being associated with a different tag that specifies a category for data in the column, the different tag separate from a column name associated with each column of data;
receiving a query to identify at least one predictive model compatible with the database table;
in response to receiving the query, using one or more processors to identify, based on one or more of the different tags, a plurality of predictive models, from a collection of predictive models, that can be applied to the database table to generate a predictive output, at least one identified predictive model being trained on data selected from a group consisting of data associated with one or more categories related to categories specified by the different tags, data associated with the same categories specified by the different tags and arranged in a different order from the data of the database table, and combinations thereof;
ranking the identified predictive models based on how closely categories of data accepted by each identified predictive model match the categories of data specified by the different tags, wherein the categories of data accepted by each identified predictive model are categories of data on which the identified predictive model has been trained;
adding a name associated with at least one of the identified predictive models to a set of names of predictive models that are compatible with the database table; and
providing the set of names of predictive models to the client device.

11. The system of claim 10, wherein the one or more computing devices are further configured to perform operations including:
applying at least one of the identified predictive models to the database table to obtain one or more predicted values; and
adding the one or more predicted values to the database table.

12. The system of claim 11, wherein adding the one or more predicted values to the database table comprises replacing a missing column value in the database table with at least one predicted value.

13. The system of claim 11, wherein adding the one or more predicted values to the database table comprises adding a new column to the database table, the new column including at least one predicted value.

14. The system of claim 10, wherein identifying the plurality of predictive models comprises identifying a first predictive model configured to:
receive, as an input, data in a category specified by at least one of the different tags; and
output data in a category specified by a second tag.

15. The system of claim 14,
wherein identifying the plurality of predictive models further comprises identifying a second predictive model from the collection of predictive models, the second predictive model being configured to receive, as an input, both data in a category specified by at least one of the different tags and data in a category specified by the second tag; and
adding a name associated with the second predictive model to the set of names of predictive models that are compatible with the database table.

16. The system of claim 15, wherein the one or more computing devices are further configured to perform operations including:
applying the first predictive model to the database table to obtain a first predicted value;
adding the first predicted value to the database table in a new column to obtain an updated database table;
subsequently applying the second predictive model to the updated database table to obtain a second predicted value; and adding the second predicted value to the updated database table.

17. The system of claim 10, wherein identifying the plurality of predictive models comprises identifying a predictive model configured to receive, as an input, data in a category specified by a second tag related to at least one of the different tags.

18. The system of claim 17, wherein the second tag is superior to or subordinate to the at least one of the different tags in a hierarchal order of tags.

19. A non-transitory storage medium having instructions stored thereon that, when executed by data processing apparatus, cause the data processing apparatus to perform operations comprising:
    obtaining, over a network, a database table from a client device, the database table including data arranged in a plurality of rows and a plurality of columns, each column of data being associated with a different tag that specifies a category for data in the column, the different tag separate from a column name associated with each column of data;
    receiving a query to identify at least one predictive model compatible with the database table;
    in response to receiving the query, using one or more processors to identify, based on one or more of the different tags, a plurality of predictive models, from a collection of predictive models, that can be applied to the database table to generate a predictive output, at least one identified predictive model being trained on data selected from a group consisting of data associated with one or more categories related to categories specified by the different tags, data associated with the same categories specified by the different tags and arranged in a different order from the data of the database table, and combinations thereof;
    ranking the identified predictive models based on how closely categories of data accepted by each identified predictive model match the categories of data specified by the different tags, wherein the categories of data accepted by each identified predictive model are categories of data on which the identified predictive model has been trained;
    adding a name associated with at least one of the identified predictive models to a set of names of predictive models that are compatible with the database table; and
    providing the set of names of predictive models to the client device.

20. The storage medium according to claim 19 wherein the instructions, when executed by data processing apparatus, cause the data processing apparatus to perform further operations comprising:
    applying at least one of the identified predictive models to the database table to obtain one or more predicted values; and
    adding the one or more predicted values to the database table.

21. The storage medium according to claim 20, wherein adding the one or more predicted values to the database table comprises replacing a missing column value in the database table with the predicted value.

22. The storage medium according to claim 20, wherein adding the one or more predicted values to the database table comprises adding a new column to the database table, the new column including at least one predicted value.

23. The storage medium according to claim 19, wherein identifying the plurality of predictive models comprises identifying a first predictive model configured to:
    receive, as an input, data in a category specified by at least one of the different tags; and
    output data in a category specified by a second tag.

24. The storage medium according to claim 23, wherein identifying the plurality of predictive models further comprises identifying a second predictive model from the collection of predictive models, the second predictive model being configured to receive, as an input, both data in a category specified by at least one of the different tags and data in a category specified by the second tag; and
    adding a name associated with the second predictive model to the set of names of predictive models that are compatible with the database table.

25. The storage medium according to claim 24, wherein the instructions, when executed by data processing apparatus, cause the data processing apparatus to perform further operations comprising:
    applying the first predictive model to the database table to obtain a first predicted value;
    adding the first predicted value to the database table in a new column to obtain an updated database table;
    subsequently applying the second predictive model to the updated database table to obtain a second predicted value; and
    adding the second predicted value to the updated database table.

26. The storage medium according to claim 19, wherein identifying the plurality of predictive models comprises identifying a predictive model configured to receive, as an input, data in a category specified by a second tag related to at least one of the different tags.

27. The storage medium according to claim 26, wherein the second tag is superior to or subordinate to the at least one of the different tags in a hierarchal order of tags.

28. The computer-implemented method of claim 1, wherein the tags are arranged in a first order, and wherein using the one or more processors to identify the plurality of predictive models from the collection of predictive models comprises:
    arranging the tags in a second order; and
    using the one or more processors to identify a predictive model that takes, as an input, categories of data arranged according to the second order.

29. The computer-implemented method of claim 1, wherein the predictive models in the collection of predictive models were trained using training data provided by a computing system other than the client device.

30. The computer-implemented method of claim 1, wherein ranking the identified predictive models comprises: (a) determining, for each identified predictive model, a number of categories of data accepted by the identified predictive model that are related to or exactly match categories of data specified by the different tags; and (b) ranking the identified predictive models in order according to the number determined in (a).

31. The computer-implemented method of claim 1, wherein the one or more categories related to categories specified by the different tags are in a same category hierarchy as the categories specified by the different tags.

32. The system of claim 10, wherein the one or more categories related to categories specified by the different tags are in a same category hierarchy as the categories specified by the different tags.

33. The storage medium according to claim 20, wherein the one or more categories related to categories specified by the different tags are in a same category hierarchy as the categories specified by the different tags.

* * * * *